United States Patent
Reichelt

(10) Patent No.: US 6,302,627 B1
(45) Date of Patent: Oct. 16, 2001

(54) MULTIPART DOWEL FOR A REMOVABLE ANCHOR

(76) Inventor: Roland Reichelt, Am Flutgraben 3, D-02899 Dittersbach (DE)

( * ) Notice: Subject to any disclaimer, the term of this patent is extended or adjusted under 35 U.S.C. 154(b) by 0 days.

(21) Appl. No.: 09/381,076
(22) PCT Filed: Jan. 12, 1999
(86) PCT No.: PCT/DE99/00035
§ 371 Date: Oct. 21, 1999
§ 102(e) Date: Oct. 21, 1999
(87) PCT Pub. No.: WO99/36703
PCT Pub. Date: Jul. 22, 1999

(30) Foreign Application Priority Data

Jan. 13, 1998 (DE) ............................................. 198 00 831
Jan. 13, 1998 (DE) ............................................. 198 00 832

(51) Int. Cl.[7] ............................... F16B 13/04; F16B 13/06
(52) U.S. Cl. ................................... 411/33; 411/24; 411/55; 411/60.2
(58) Field of Search ............................ 411/24, 32, 33, 411/55, 60.1, 60.2, 43

(56) References Cited

U.S. PATENT DOCUMENTS

| | | | |
|---|---|---|---|
| 4,475,856 | * | 10/1984 | Toomingas ............................. 411/33 |
| 4,523,880 | * | 6/1985 | Isler ..................................... 411/33 X |
| 5,536,122 | * | 7/1996 | Weber .................................... 411/33 |
| 5,779,410 | * | 7/1998 | Lautenschlager et al. ............ 411/33 |

FOREIGN PATENT DOCUMENTS

| | | | |
|---|---|---|---|
| 302 654 | | 10/1954 | (CH) . |
| 2435152 | * | 2/1976 | (DE) ..................................... 411/32 |
| 27 11 845 | | 9/1978 | (DE) . |
| 30 36 627 | | 5/1982 | (DE) . |
| 32 20 936 | | 12/1983 | (DE) . |
| 34 31 905 | | 3/1986 | (DE) . |
| 37 14 008 | | 11/1988 | (DE) . |
| 39 16 818 | | 12/1990 | (DE) . |
| 43 24 244 | | 6/1994 | (DE) . |
| 43 10 796 | | 10/1994 | (DE) . |
| 195 43 214 | | 5/1997 | (DE) . |
| 1 496 970 | | 1/1978 | (GB) . |

\* cited by examiner

Primary Examiner—Neill Wilson
(74) Attorney, Agent, or Firm—Collard & Roe, P.C.

(57) ABSTRACT

A multi-component dowel for a removable anchor comprises an outer dowel sleeve and an expander with a collar gripping over an end of the dowel sleeve. The expander is movable within the dowel sleeve. There is at least one dowel sleeve ring bead arranged on an inner side of the dowel sleeve in an axial direction and tapering with respect to a symmetry axis in the direction of a plug-in opening. There is at least one expander ring bead formed on an outer wall of the expander. The expander ring bead has a pitch opposing the pitch of the dowel sleeve ring bead. There is at least one clamping element located in a free space between the dowel sleeve ring based and the expander ring bead.

29 Claims, 3 Drawing Sheets

MULTIPART DOWEL FOR A REMOVABLE ANCHOR

BACKGROUND OF THE INVENTION

1. Field of the Invention

The invention relates to a multipart dowel for a removable anchor with an anchor pin which can be repeatedly pushed in and released.

2. The Prior Art

Anchors for board linings, which are undetachably inserted in brickwork by means of dowels, are known from DE 39 16 818. Said anchors carry thickenings and with the latter press a driving sleeve against the wall of the borehole in the brickwork. Saw teeth or lamellae disposed against the pulling direction prevent the anchor from being pulled from the borehole.

Furthermore, an anchor bolt with spreading wedges is described in DE 37 14 008. In the present case, the anchor bolt is enveloped by a spreading wedge. When the anchor bolt is pushed in the borehole, the spreading wedge is pressed spreaded against the wall of the borehole. An unreleasable connection is produced in this case as well. The same applies to a spreading anchor according to DE 43 24 244, which is made of metal. In this case, a conical anchor head presses a spreading tube against the wall of the borehole.

Multi-component dowels are known as well. DE 43 10 796 describes a spreading anchor which is enveloped by at least two spreading tubes, which are plugged one into the other. When the anchor is axially pulled, the spreading sleeves are spread radially for anchoring the anchor. Metal or plastic dowels are known from DE 30 36 627 and DE 27 11 845, which consist of a dowel sleeve and a dowel, whereby the dowel sleeve has a plurality of inclined scales, tongues and bridges on the outer side, which permit insertion of the dowel into the boreholes in the axial direction and wedge themselves against said direction. All of said dowels are intended to unreleasable retain anchor bolts in the underground.

Adjustable and releasable dowels are equipped with a thread. For example, an adjustable spreading dowel is known from DE 34 31 905, which consists of a dowel sleeve and a spreading body, whereby on the outer jacket surface of the spreading body, a thread located on the innter jacket surface of the dowel sleeve cooperates with the jacket surface of the spreading body. For removing the anchor bolt, CH-P 30 26 54 makes provision for a screw connection between an anchor, threaded jaws and a dowel sleeve, into which the anchor provided with a thread is pushed between the threaded jaws and spreads the latter, so that the threads will not interfere. When subjected to pulling load, the wedge surfaces of the threaded jaws and the threads get wedged and retain the anchor. The anchor can be removed from the dowel by turning it, screwing it out of the latter.

A removable two-component anchor-setting dowel for anchor pins has already been proposed, which is pushed into a borehole and secures the anchor pin by wedging against unintended loosening (DE 195 43 214). At least one groove with slanted flanks forming oblique planes pointing away from the opening of the borehole, and forming a parellelogram viewed in the cross section, is located in the inner wall of the outer dowel sleeve lining the borehole. A dowel-setting ring is fitted in the interior of the dowel sleeve, leaving a free space, said dowel-setting ring carrying on its outer jacket at least one ring forming in the cross section a parallelogram with slanted side surfaces corresponding with the flanks of the groove, and engaging the groove, partially filling the latter. The inner wall of the dowel setting ring carries zones of higher pressure and greater friction at least within the region of the ring or rings. For installing the anchor-setting dowel, the dowel sleeve is slotted lengthwise. It may be open also at the bottom, so that the dowel-setting ring without collar is pushed into the dowel sleeve from the bottom and the collar is then secured on the dowel-setting ring after it has been pushed in. Also, the dowel sleeve can be cut from a web and wound around the dowel-setting ring. Said dowels can be used only after they have been completely assembled. Replacement of the dowel-setting ring—which is subjected to wear—in the anchored dowel sleeve is not possible.

SUMMARY OF THE INVENTION

The problem of the invention is to find a multi-component: dowel for an anchor with an anchor pin without thread that can be removed with simple means, and which can be pushed in and released repeatedly.

The solution to said problem is the subject matter of the invention disclosed in the characterizing parts of the first two patent claims. Further useful developments of the invention are the objects of the dependent claims.

The multi-part dowel according to claim 1 is particularly suitable as a dowel for heavy loads. It is plugged into a borehole located in the material in which the dowel is to be arranged. The multi-component dowel for a detachable heavy-duty anchor with an anchor pin consists of a dowel sleeve and a spreading body which rests with a collar on the opening of the dowel, gripping over the dowel sleeve, and which secures the heavy-duty anchor pin against unintended loosening by locking it. The dowel sleeve, which is anchored in the borehole with teeth and which lines the borehole, carries on its inner side a plurality of ring beads arranged one after the other, said ring beads being opposed by ring beads located on the outer wall of the expanding body. Said ring beads are designed in such a way that when the spreading body is displaced against the dowl sleeve, pressure forces act against the heavy duty anchor pin and the borehole. Rotating clamping elements are inserted in the free spaces formed between the beads.

The advantages offered by said embodiment according to claim 1 of the invention are particularly easier installation and removal of heavy load fastenings, variably adjustable lengths of the heavy duty anchor pins for receiving the load, higher admission of force into the heavy-load anchor pin, superior nonpositive lock between the heavy-duty anchor pin and the receiving boregole, as well as a variable cross section of the heavy-duty anchor pin depending on the case of application.

The multi-component dowel according to claim 2 is particularly designed as a two-part dowel for anchor pins. It is pushed into a borehole located in the material in which the dowel is to be installed. Said dowel secures the anchor pin against unintended loosening by wedging it, and carries in the inner wall of the outer dowel sleeve lining the borehole a groove with slanted flanks forming oblique planes pointing away from the opening of the borehole, said flanks extending from the opening of the borehole. The groove extends along the inner wall in the form of a spiral. An expanding body is located in the dowel sleeve, which body can be turned into the dowel sleeve, and can be slightly displaced in the axial direction of the dowel. On its outer jacket, said spreading body carries at least one bead capable of engaging with its flanks the flanks of the dowel sleeve, forming side surfaces corresponding with the flanks of the groove, thereby permitting the spreading body to expand when the dowel sleeve and the expanding body are suitably positioned in relation to one another. The bead extends along the expanding body in the form of a spiral with the same pitch as the groove and partially fills the groove.

BRIEF DESCRIPTION OF THE DRAWINGS

The invention is explained in greater detail in the following with the help of exemplified embodiments shown in the associated drawing, in which.

Figure 5:
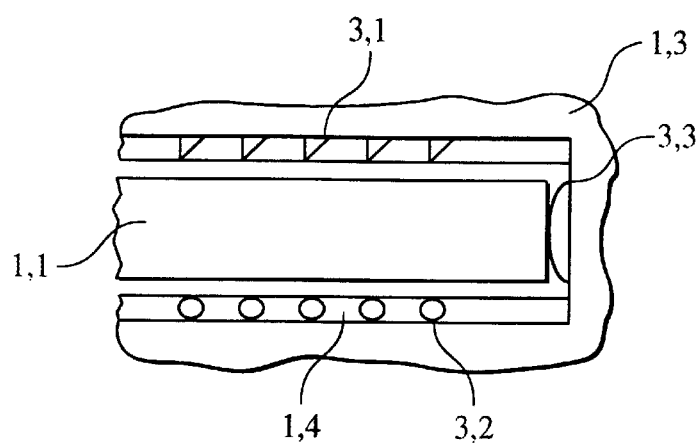
FIG. 5 shows a section through the dowel showing spike and corundum elements embedded in the lining.

The multi-component dowel for a detachable heavy-duty anchor with an anchor pin consists of a dowel sleeve 1,2 and an expanding body 1,3. The heavy-duty anchor pin 1,1, which carries the load to be secured thereon, is plugged into the expanding body 1,3, which is preferably lined with a lining 1,4. The expanding body 1,3 is enveloped by the dowel sleeve 1,2. The spreading body 1,3 engages with a spreading body collar 1,5 the plug opening 1,5 for the heavy-duty anchor pin 1,1 covering the end of the dowel sleeve 1,2. The dowel sleeve, 1,2, which can be anchored with the teeth 1,7 in a borehole not shown, and which lines said borehole, carries a plurality of dowel sleeve ring beads 1,8 arranged on its inner side one after the other. Said dowel sleeve ring beads 1,8 are tapered with respect to the symmetry axis and in the direction of plug opening 1,6. Expanding body ring beads 1,9 are located on the outer wall of the expanding body 1,3. Said expanding body ring beads 1,9 are designed with a pitch opposing the pitch of the dowel sleeve ring beads 1,8. Rotationally movable clamping elements 1,11 are inserted in the free spaces 1,10 formed between the dowel sleeve ring beads 1,8 and the expanding body ring beads 1,9. Said clamping elements 1,11 are preferably balls. When the heavy-load anchor pin 1,1 is subjected to tensile load, the expanding body 1,3 gets clamped via the clamping elements 1,11 with the dowel sleeve 1,2, because of the ring beads 1,8 and 1,9 as defined by the invention. The lining 1,4 located in the expanding body 1,3, said lining being elastic under pressure, increases its friction on the heavy-duty anchor pin 1,1 when the expanding body 1,3 is compressed. For said purpose, spike elements 3,1 or corundum elements 3,2, shown in FIG. 5, are located in the pressure-elastic lining 1,4. Under pressure, said spike or corundum elements 3,1, 3,2 are released from the elastic lining 1,4, such pressure being generated when the heavy-duty anchor pin 1,1 is loaded, and act on the heavy-duty anchor pin 1,1. The pressure-elastic lining 1,4, may also be provided with a structure in the form of bridges extending longitudinally or crosswise relative to the expanding body 1,3. Bridges made of pressure-elastic material directly abut the heavy duty anchor pin 1,1. In between are bridges made of material with a high coefficient of friction; however, said bridges are not in contact with the heavy-duty anchor pin 1,1 in the unloaded condition. When the heavy-duty anchor pin 1,1 is axially loaded by tension, the expanding body 1,3 is pulled from the dowel sleeve 1,2. In the decreasing volume of the free spaces 1,10, the clamping elements 1,11 press against the walls of the dowel sleeve 1,2 and the expanding body 1,3, generating radially acting forces outwardly in the direction of the borehole, and inwardly in the direction of the heavy-duty anchor pin 1,1, such forces acting on the latter. This causes deformation of the pressure-elastic material of lining 1,4 as well as engagement of the material with the high coefficient of friction, which in turn retains the heavy-duty anchor pin 1,1. For removing the heavy-duty anchor pin 1,1, the latter is pressed into the dowel; the clamping elements 1,11 reduce the pressure acting on the heavy-duty anchor pin 1,1 in the free spaces 1,10, the latter decreasing their volume as the pin is being pushed into the expanding body 1,3 displacing the dowel; the lining 1,4 presses the expanding body 1,3 away from the heavy-duty anchor pin 1,1; and by applying pressure to the expanding body collar 1,5 of expanding body 1,3 in said position, heavy-duty anchor pin 1,1 can be pulled from the dowel as defined by the invention.

In the normal case, the expanding body 1,3 has a hollow space with a round cross section for receiving the heavy-duty anchor pin 1,1. However, for special cases, said hollow space may have a polygonal or elliptical cross section. For example, when using a square heavy-load anchor pin, no rotation of such heavy-duty anchor pin is possible.

In the course of manufacture of a dowel as defined by the invention according to claim 1, it is advantageous if the clamping elements 1,11 are arranged in chambers located in dowel sleeve 1,2 under sealable openings. In this way, the clamping elements 1,11 are fixed in the free spaces 1,10 in a defined position within the dowel.

If the expanding body collar 1,5 is omitted in the manufacture of the dowel, heavy-duty anchor pin 1,1 can not be removed without special tools. In addition to the spherical shape, the clamping elements 1,11 also may be designed in the form of rolls, rings, ring segments or cones.

The interior hollow space of expanding body 1,3 may be open at both ends. This makes it possible to use heavy-duty anchor pins 1,1 with great length, and the heavy-duty anchor pins 1,1 can be pushed by the dowel into the correspondingly deep material borehole depending on the application purpose. The result thereof is that the length of the heavy-duty anchor pin for receiving the load can be variably adjusted as said pin is being engaged.

A spring 3,3, such as shown in FIG. 5, for example a leaf or a coil spring, may be arranged in the interior hollow space of the expanding body 1,3 between the end of the expanding body and the end of the heavy-duty anchor pin, such spring prestressing the heavy-duty anchor pin 1,1 and effecting superior clamping even in extreme load cases, for example with swinging loads. The spring 3,3 may be arranged within the region of a free space 1,10 between the dowel sleeve 1,2 and the expanding body 1,3, but in this case as a coil spring. It is possible also to arrange such a spring between the end of the dowel sleeve and the end of the expanding body.

For a superior solution for the heavy-duty anchor pin 1,1, at least one dowel sleeve ring bead 1,8 and a corresponding expanding body ring bead 1,9 can be designed with respect to their ends in such a way that they form an acute angle relative to their base; engage one another; and that surfaces in contact with each other are arranged in the form of a wedge relative to each other. For this purpose, heavy-duty anchor pin 1,1 is pushed into the dowel, in which process the expanding body 1,3 is displaced versus the dowel sleeve as well. The surfaces now in contact with each other, said surfaces being disposed wedge-like relative to one another, effect spreading of the expanding body 1,3. In this position, heavy-duty anchor pin 1,1 can be very easily pulled from the interior hollow space of expanding body 1,3.

Figure 1:
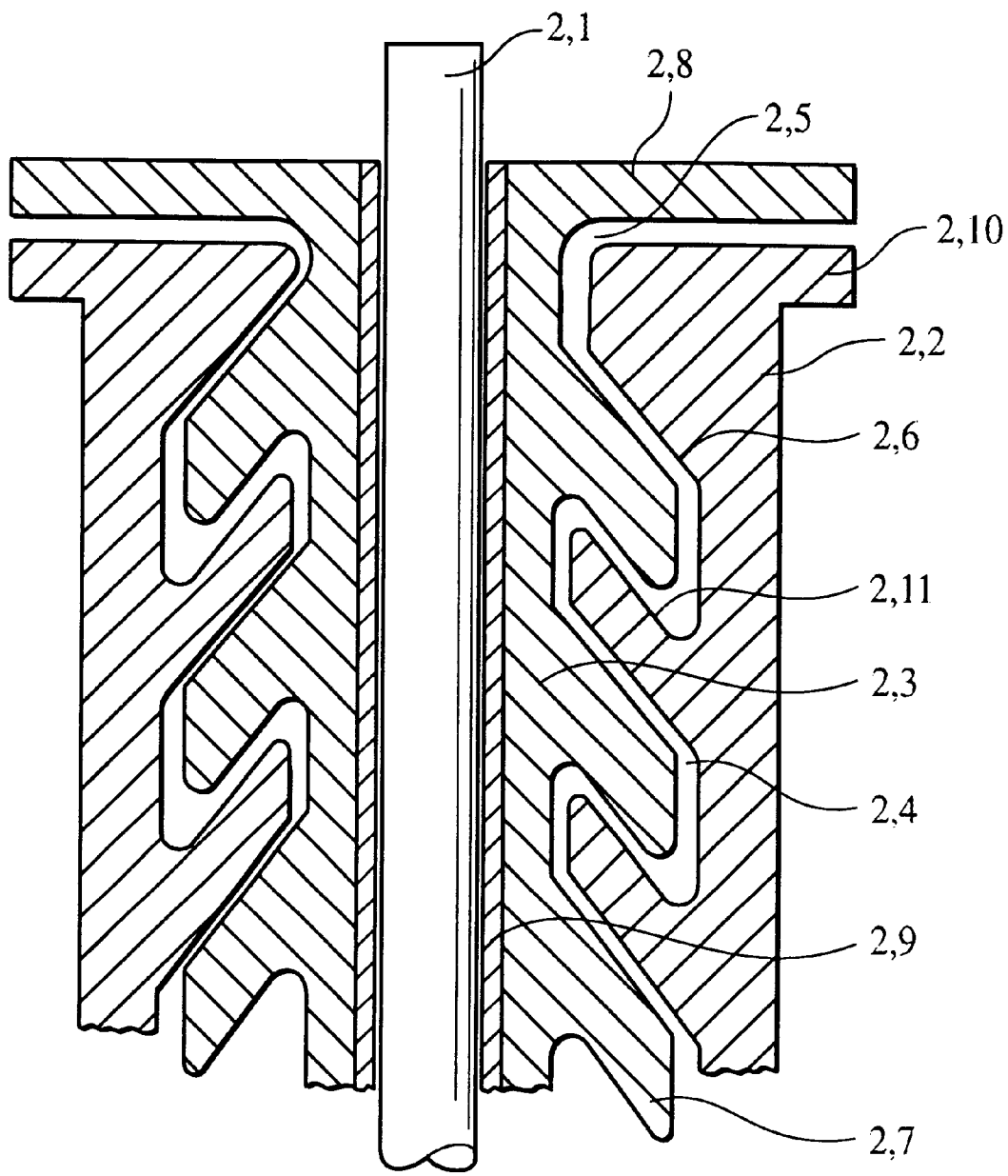
FIG. 1 shows a section through a multi-component dowel for detachable anchor pins.
Figure 2:
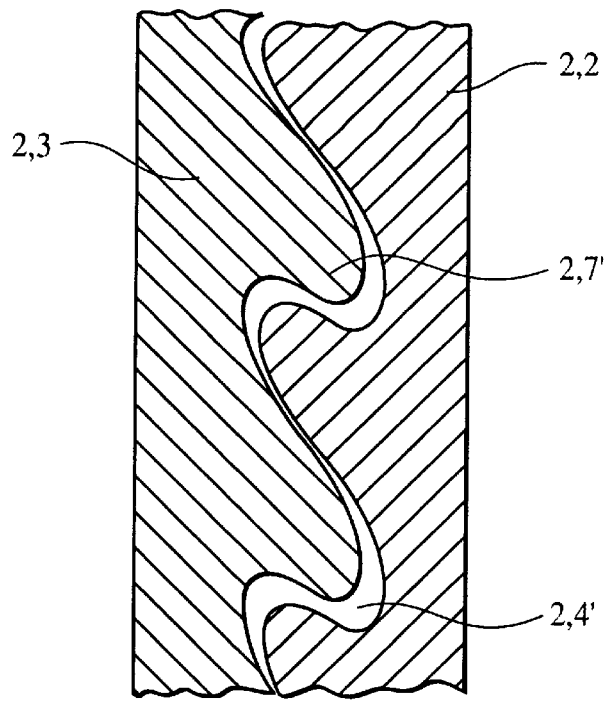
FIG. 2 shows a wavelike design of the mating and corresponding flanks of the dowel sleeve of a multi-component dowel and the expanding body.
Figure 3:
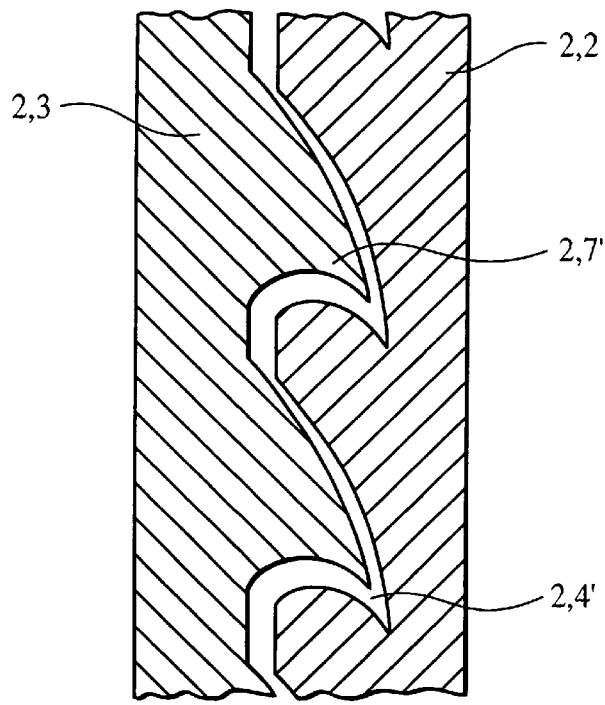
FIG. 3 shows a tooth like embodiment of said flanks of a multi-component dowel.
Figure 4:
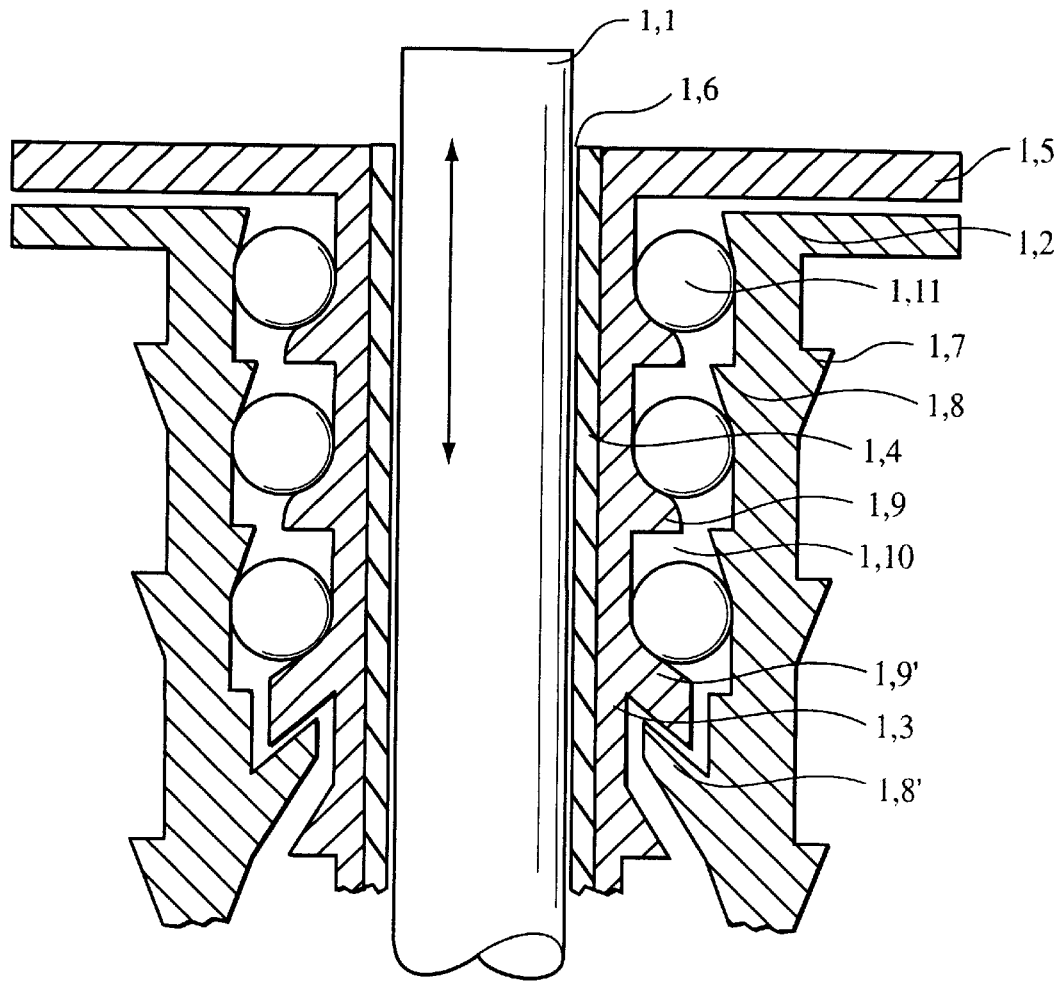
FIG. 4 shows a section through a multi-component dowel for detachable heavy-load anchors.

FIGS. 1 to 3 show a multi-component dowel according to claim 2 for detachable anchor pins. According to the invention, the multi-component dowel designed in the form of a two-part dowel for anchor pins 2,1 consists of a dowel sleeve 2,2, into which an expanding body 2,3 is turned. For this purpose, a groove 2,4 is arranged in dowel sleeve 2,2, said groove having the slanted flanks 2,6 and 2,11 forming oblique planes pointing away from opening 2,5 of dowel sleeve 2,2, said flanks starting from the opening 2,5 of dowel sleeve 2,2, with said groove extending along the inside wall in the form of a spiral. On its outer jacket, the expanding body 2,3 carries a head 2,7 forming side surfaces corresponding with the flanks 2,6 and 2,11 of groove 2,4 and extending as a spiral with the same pitch as groove 2,4 along the expanding body 2,3. After the expanding body 2,3 has been turned into dowel sleeve 2,2, the bead 2,7 fills groove 2,4 only partially and permits limited axial sliding of expanding body 2,3 in the axial direction of the dowel. With an expanding body collar 2,8, expanding body 2,3 engages the opening 2,5, covering the end of dowel sleeve 2,2. Preferably a pressure-elastic lining 2,9 is located in the expanding body 2,3, said lining 2,9 raising the friction on anchor pin 2,1 when load is introduced via the anchor pin 2,1. The bead 2,7 on expanding body 2,3 and the groove 2,4 may have a cross section deviating from the one of a parallelogram. For example, the bead 2,7' and the groove 2,4' may have a saw tooth-like or wavelike cross section cut along the symmetry axis. For securing the dowel in the material borehole, elevations may be arranged on dowel sleeve 2,2 on the external side.

For mounting the two-component dowel for anchor pins 2,1, the expanding body 2,3 is turned into the borehole up to the stop pf collar 2,8. For fastening an anchor pin 2,1 in a dowel plugged into a material bore, anchor pin 2,1 is pu shed into the expanding body 2,3 and in this process pushes the latter deeper into the dowel sleeve 2,2. This causes the expanding body 2,3 to run up on the flanks 2,11 of groove 2,4 with its bead 2,7 and to expand, so that anchor pin 2,1 can be easily pushed in. Now, when the anchor pin 2,1 is subjected to tensile load, it pulls the expanding body 2,3 from dowel sleeve 2,2 because of the friction grip. In this process, bead 2,7 runs up on the flanks 2,6 of groove 2,4, which causes the expanding body 2,3 to be compressed, which increases the friction on anchor pin 2,1. This effect is reinforced by the lining 2,9, which is structured in such a way that when the expanding body 2,3 is compressed, the inner surface engages anchor pin 2,1 with a high coefficient of friction. When anchor pin 2,1 has to be removed from the dowel, it is pushed into the dowel together with the expanding body, and the spreading body 2,3 is expanded. This process is supported by the pressure-elastic lining 2,9. By admitting pressure to the expanding body collar 2,8, expanding body 2,3 is retained in this position, and anchor pin 2,1 can be pulled from the dowel.

On its external circumference, the dowel sleeve 2,2 may have one or a plurality of embossings, on which the dowel can be separated. Thus such embossings serve for adapting the length of the dowel.

For the purpose of increasing the friction on anchor pin 2,1, spike elements preferably aligned slanted relative to the symmetry axis, or corundum elements may be embedded in the pressure-elastic lining 2,9.

In the normal case, the expanding body 2,3 has a hollow space with a round cross section for receiving the anchor pin 2,1. However, for special cases, said hollow space also may have a polygonal cross section, for example when a square anchor pin 2,1 is used, so that the latter can not be turned. Turning of the expanding body 2,3 versus the dowel sleeve 2,2 is prevented by arranging a corrugation on dowel sleeve collar 2,10 and/or on expanding body collar 2,8. Such corrugation preferably consists of a sequence of elevations and deepenings. When swinging loads are intended and when a smooth anchor pin 2,1 is used, a groove is provided on the inside on the expanding body 2,3, such groove extending through over the entire length, whereby such a groove has one or a plurality of lateral radial recesses. Such recesses are engaged by turning noses additionally attached on the anchor pin 2,1, so that automatic loosening of anchor pin 2,1 is reliably prevented.

A spring, for example a leaf or coil spring also may be arranged in the interior hollow space of the expanding body 2,3 between the end of the expanding body and the end of the anchor pin, such spring prestressing the anchor pin 2,1 and effecting superior clamping also in cases of extreme, for example swinging loads. Such a spring can be arranged also between the end of the dowel sleeve and the end of the expanding body.

For special application cases, the expanding body 2,3 can be slotted and made of solid material or materials having different thicknesses.

What is claimed is:

1. A multi-component dowel for a removable anchor comprising:
    an outer dowel sleeve;
    an expander with a collar gripping over an end of the dowel sleeve, said expander being movable within said dowel sleeve;
    at least one dowel sleeve ring bead arranged on an inner side of said dowel sleeve in an axial direction and tapering with respect to a symmetry axis in the direction of a plug-in opening;
    at least one expander ring bead formed on an outer wall of said expander, said expander ring bead having a pitch opposing the pitch of the dowel sleeve ring bead; and
    at least one clamping element located in a free space between the dowel sleeve ring bead and the expander ring bead.

2. The multi-component dowel according to claim 1, wherein the expander is lined on its inside with a pressure-elastic lining.

3. The multi-component dowel according to claim 1, wherein the clamping elements are selected from the group consisting of balls, rolls, rings, ring segments and cones.

4. The multi-component dowel according to claim 1, wherein the clamping elements are arranged in chambers.

5. The multi-component dowel according to claim 2, further comprising spike elements or corundum elements embedded in the pressure-elastic lining in an angular position deviating from a symmetry axis.

6. The multi-component dowel according to claim 2, wherein the pressure-elastic lining is divided in bridges extending lengthwise or crosswise relative to the expander.

7. The multi-component dowel according to claim 6, wherein some of said bridges abut a heavy-load anchor pin and wherein other of said bridges are made of a material with a high coefficient of friction and are arranged between said abutting bridges and not abutting said heavy-load anchor pin when said pin is in an unloaded condition.

8. The multi-component dowel according to claim 1, wherein the expander has an inner hollow space with a polygonal or elliptical cross section.

9. The multi-component dowel according to claim 1, wherein the dowel sleeve ring beads are arranged on the expander and the expander ring beads are arranged on the dowel sleeve.

10. The multi-component dowel according to claim 1, wherein the expander has an inner hollow space that is open at both ends.

11. The multi-component dowel according to claim 7, further comprising a spring arranged in the inner opening of the expander between an end of the expander and an end of the heavy-duty anchor pin.

12. The multi-component dowel according to claim 1, further comprising a coil spring arranged in a free space between the dowel sleeve the expander.

13. The multi-component dowel according to claim 1, further comprising a spring arranged between an end of the dowel sleeve and an end of the expander.

14. The multi-component dowel according to claim 1, wherein the expander consists of solid material.

15. The multi-component dowel according to claim 1, wherein said at least one dowel sleeve ring bead and a corresponding one of said at least one expander ring bead have ends designed so that said beads form an acute angle with respect to their base and engage one another, and wherein two surfaces of said beads contacting one another are arranged in the form of a wedge relative to each other.

16. A multi-component dowel for a removable anchor, comprising:
an outer dowel sleeve having an opening and an inner wall, said inner wall having a groove with slanted flanks forming oblique planes pointing away from the opening of the dowel sleeve, said groove extending in the form of a spiral;
an expander arranged within said outer dowel sleeve and being turnable within said dowel sleeve, said expander having an outer jacket with a bead and forming slanted side surfaces that correspond with the flanks of the groove, wherein said bead extends along said expander in the form of a spiral having the same pitch as said groove,
wherein said groove partially permits a limited sliding of the expander in an axial direction of the dowel.

17. The multi-component dowel according to claim 16, wherein the expander is lined on its inside with pressure-elastic lining.

18. The multi-component dowel according to claim 16, wherein the expander has a wall that is slotted lengthwise.

19. The multi-component dowel according to claim 16, wherein said dowel sleeve and expander have collars and wherein at least one of the dowel sleeve collar and expander collar has a corrugation in the form of a sequence of elevations and deepenings.

20. The multi-component dowel according to claim 17, further comprising spike elements or corundum elements incorporated in the pressure-elastic lining.

21. The multi-component dowel according to claim 16, wherein the expander has an inner hollow space with a polygonal or elliptical cross section.

22. The multi-component dowel according to claim 16, wherein the bead on the expander has a cross section along a symmetry axis that deviates from a parallelogram.

23. The multi-component dowel according to claim 22, wherein the groove and the bead have a wavelike or saw-tooth-like shape on the flanks of the dowel sleeve and expander, said groove and bead engaging one another and corresponding with one another.

24. The multi-component dowel according to claim 16, wherein elevations are arranged externally on the dowel sleeve.

25. The multi-component dowel according to claim 16, further comprising a groove having at least one lateral radial recess arranged on the inside of said expander.

26. The multi-component dowel according to claim 16, further comprising a spring arranged in an inner opening of said expander between an end of the expander and an end of an anchor pin.

27. The multi-component dowel according to claim 16, further comprising a spring arranged between the dowel sleeve and expander.

28. The multi-component dowel according to claim 16, further comprising at least one embossing arranged on said dowel sleeve, said embossing being visible on the outer circumference of said dowel sleeve.

29. The multi-component dowel according to claim 16, wherein the expander is comprised of one of a solid material and materials having different thicknesses.

* * * * *